United States Patent [19]

Lee et al.

[11] Patent Number: 5,194,937
[45] Date of Patent: Mar. 16, 1993

[54] TELEVISION SIGNAL CONVERTING APPARATUS AND METHOD

[75] Inventors: Chang-jun Lee, Kyunggi; Seok-yun Jeong, Seoul, both of Rep. of Korea

[73] Assignee: Samsung Electronics Co., Ltd., Kyunggi, Rep. of Korea

[21] Appl. No.: 798,813

[22] Filed: Nov. 27, 1991

[30] Foreign Application Priority Data

Sep. 30, 1991 [KR] Rep. of Korea ............... 91-17342

[51] Int. Cl.⁵ .............................................. H04N 7/01
[52] U.S. Cl. ........................................ 358/11; 358/138
[58] Field of Search ................... 358/11, 12, 140, 138, 358/141, 180

[56] References Cited

U.S. PATENT DOCUMENTS 4,984,081  1/1991  Miyoshi et al. .............. 358/180
5,070,395  12/1991  Kitaura et al. .............. 358/140

FOREIGN PATENT DOCUMENTS

0007685  1/1990  Japan .
0291790  12/1990  Japan .
0050988  3/1991  Japan .
0068291  3/1991  Japan .

Primary Examiner—James J. Groody
Assistant Examiner—David E. Harvey
Attorney, Agent, or Firm—Rothwell, Figg, Ernst & Kurz

[57] ABSTRACT

A television signal converting system which converts a television signal having a different broadcasting method to be displayed on another type television receiver by performing a signal converting process. The system performs a scanning line conversion for an arbitrary television signal to separate at least two luminance and color difference signals having different scanning line numbers corresponding to at least two picture screen modes. The system selects the luminance and color difference signals according to the screen mode among the separated at least two luminance and chrominance signals and then samples the selected luminance and color difference signals by the scanning line number corresponding to the picture screen mode.

8 Claims, 5 Drawing Sheets

TELEVISION SIGNAL CONVERTING APPARATUS AND METHOD

BACKGROUND OF THE INVENTION

The present invention relates to an apparatus and method for converting an arbitrary type television signal into a different type television signal, and more particularly to an apparatus and method for converting an arbitrary type television signal to a different type television signal to have plural aspect ratios.

Present television systems differ according to nations and regions. These differences include the number of scanning lines, the aspect ratio of the screen, the scanning method, etc. Furthermore, current television systems have limited resolutions. Accordingly, a television system having better resolution than current systems is being developed. One recently developed television system having excellent resolution is a high definition television system (HDTV) called a MUSE-type, (Multiple Sub-Nyquist Sampling Encoding) which was developed in Japan. The MUSE-type system has 1,125 scanning lines and a screen aspect ratio of 16:9. Accordingly, the present NTSC-type television receiver having 525 scanning lines and a 4:3 screen aspect ratio cannot receive the MUSE-type television signal. Thus, in order to receive the MUSE-type television signal by present NTSC-type television receivers, a television signal converter is required to convert the MUSE-type television signal into the NTSC-type television signal.

The conventional television signal converter for accomplishing the above conversion is disclosed in Japanese laid-open Patent No. Hei 2-291790. According to this disclosure, the conventional television signal converter performs conversion of the scanning line number and interpolation of a television signal having the 16:9 aspect ratio and 1,125 scanning lines, thereby converting it to a television signal having a 4:3 aspect ratio and 525 scanning lines. This conventional television signal converter twice performs the scanning line conversion, scanning line interpolation, and speed conversion, to convert a television signal having an aspect ratio of 16:9 and 1,125 scanning lines into a television signal having a predeterminedly different aspect ratio and, say, 350 scanning lines.

As a result, the conventional television signal converter has problems in that the signal processing to convert the MUSE-type television signal into an NTSC-type television signal is overly complex. Moreover, circuit construction is also complicated.

SUMMARY OF THE INVENTION

Accordingly, an object of the present invention is to provide a television signal converting apparatus and method thereof which can simplify the signal processing which converts the MUSE television signal into an NTSC television signal having a different aspect ratio and scanning line number.

To achieve the object of the present invention, there is provided a television signal converting apparatus comprising:

vertical filtering means for converting the scanning line of an arbitrary television signal and separating at least two sets of luminance and color difference signals having different scanning line numbers corresponding to at least two screen modes;

a signal selector for selecting luminance and color difference signals according to a screen mode among the outputs of the vertical filtering means; and frequency converting means for horizontally lengthening the output of the signal selector.

There is also provided a television signal converting method for converting a MUSE television signal having 1,125 scanning lines into another television signal having a different scanning line number according to a picture screen mode, which comprises the steps of:

vertically filtering an inputted MUSE television signal for generating at least two sets of luminance and color difference signals having a different vertical correlation from the MUSE television signal;

selecting one luminance signal and two color difference signals among the at least two luminance and color difference signals generated in the vertical filtering step according to the picture screen mode; and frequency-converting to sample the one luminance signal and two color difference signals selected in the selecting step into a luminance signal and two color difference signals having the scanning line number corresponding to the picture screen mode, and to horizontally lengthen the sampled luminance and color difference signals.

BRIEF DESCRIPTION OF THE DRAWINGS

The above object and other advantages of the present invention will become more apparent by the following description of the preferred embodiment of the present invention with reference to the attached drawings, in which.

DETAILED DESCRIPTION OF THE INVENTION

Hereinafter, the present invention will be described in detail with reference to the accompanying drawings.

Figure 1:
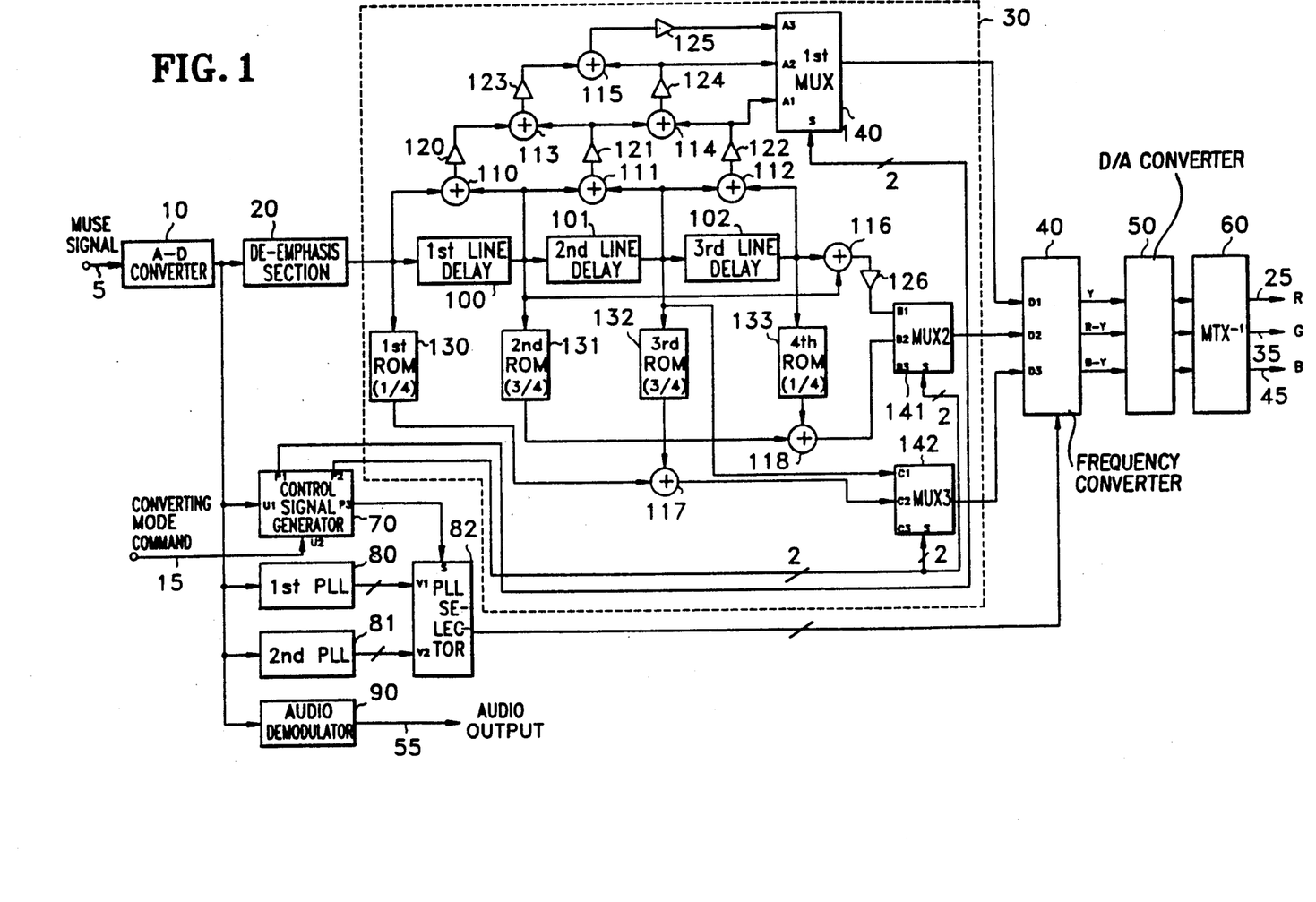
FIG. 1 shows an embodiment of a television signal converting apparatus according to the present invention.

FIG. 1 is a circuit diagram of an embodiment of the television signal converting apparatus according to the present invention. In FIG. 1, a first input terminal 5 is connected to a MUSE signal source to receive an analog MUSE signal, and is also connected to the input of an analog-to-digital converter (hereinafter referred to as A-D converter) 10. The output of A-D converter 10 is connected to the input of a de-emphasis section 20, the first input terminal U1 of a control signal generator 70, inputs of first and second PLL (Phase Locked Loop) portions 80 and 81, and the input of an audio demodulator 90. The output of de-emphasis section 20 is connected to the input of a first line delay 100, the input of a first ROM 130, and a first input of a first adder 110. The output of first line delay 100 is connected to the input of a second line delay 101, a second input of first adder 110, a first input of a second adder 111, a second input of a seventh adder 116, and the input of a second ROM 131. The output of second line delay 101 is connected to the input of a third line delay 102, a second input of second adder 111, a first input of a third adder 112, the input of a third ROM 132, and a first input terminal C1 of a third multiplexer 142. The output of third line delay 102 is connected to a second input of third adder 112, a first input of seventh adder 116, and the input of a fourth ROM 133. The output of first adder 110 is connected to a first input of a fourth adder 113 through a first 3 dB attenuator 120. The output of second adder 111 is connected to a second input of fourth adder 113 and a first input of a fifth adder 114 through a second 3 dB attenuator 121. The output of third adder 112 is connected to a second input of fifth adder 114 and a first input terminal A1 of a first multiplexer 140 through a third 3 dB attenuator 122. The output of fourth adder 113 is connected to a first input of a sixth adder 115 through a fourth 3 dB attenuator 123. The output of fifth adder 114 is connected to a second input of sixth adder 115 and a second input terminal A2 of first multiplexer 140 through a fifth 3 dB attenuator 124. The output of sixth adder 115 is connected to a third input terminal A3 of first multiplexer 140 through a sixth 3 dB attenuator 125.

The output of first multiplexer 140 is connected to a first input terminal D1 of a frequency converter 40. The output of seventh adder 116 is connected to a first input terminal B1 of a second multiplexer 141 through a seventh 3 dB attenuator 126. The output of first ROM 130 is connected to a first input of an eighth adder 117. The output of second ROM 131 is connected to a first input of a ninth adder 118. The output of third ROM 132 is connected to a second input of eighth adder 117. The output of fourth ROM 133 is connected to a second input of ninth adder 118. The output of eighth adder 117 is connected to a second input terminal C2 of third multiplexer 142. The output of ninth adder 118 is connected to a second input terminal B2 of second multiplexer 141. The output of second multiplexer 141 is connected to a second input terminal D2 of frequency converter 40. The output of third multiplexer 142 is connected to a third input terminal D3 of frequency converter 40. First, second and third outputs of frequency converter 40 are correspondingly connected to the first, second and third inputs of a digital-to-analog converter (hereinafter referred to as a D-A converter) 50. First, second and third outputs of D-A converter 50 are correspondingly connected to the first, second and third inputs of an inverse matrix circuit 60. First, second and third outputs of inverse matrix circuit 60 are correspondingly connected to first, second and third output terminals 25, 35 and 45. A second input terminal 15 is connected to a mode selecting switch (not shown) or a central processing unit (not shown) to receive a mode assigning signal, and is also connected to a second input terminal U2 of control signal generator 70. The output of first PLL portion 80 is connected to a first input terminal V1 of a PLL selector 82. The output of second PLL portion 81 is connected to a second input terminal V2 of PLL selector 82. The output of PLL selector 82 is connected to the control terminal of frequency converter 40. A first output terminal P1 of signal generator 70 is connected to a selection terminal S of first multiplexer 140, while a second output terminal P2 thereof is connected to each selection terminal S of second and third multiplexers 141 and 142, and its third output terminal P3 is connected to a selection terminal S of PLL selector 82. The output terminal of audio demodulator 90 is connected to a fourth output terminal 55.

Figure 2A:
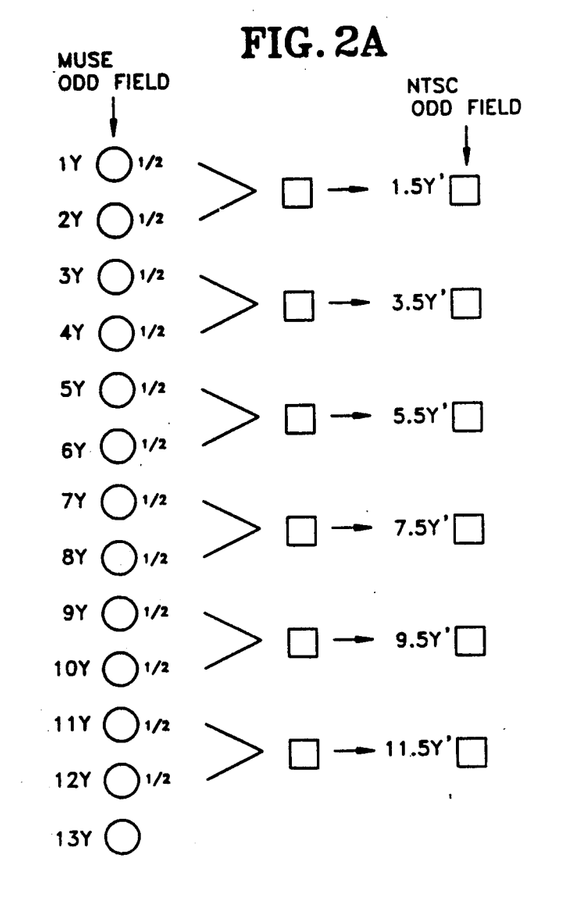
FIGS. 2A to 2D are principle diagrams showing the conversion of the scanning line number according to the present invention.
Figure 2B:
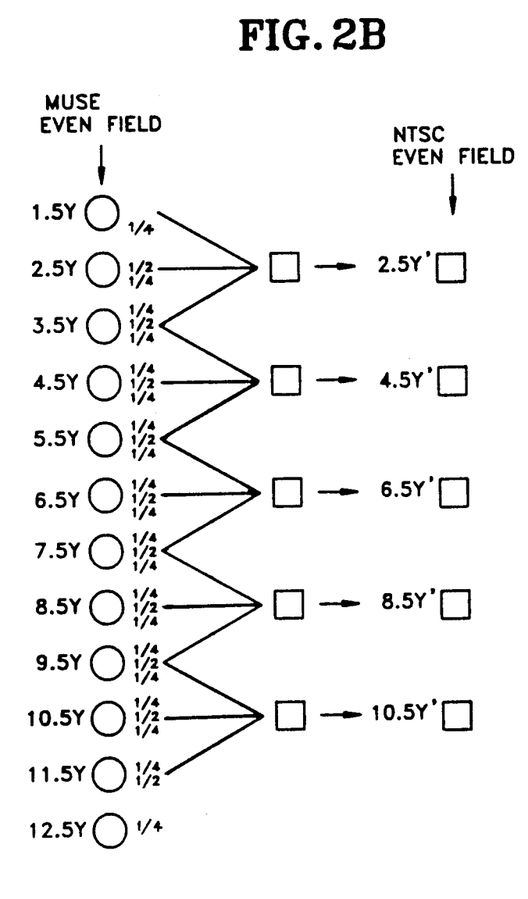
Figure 2C:
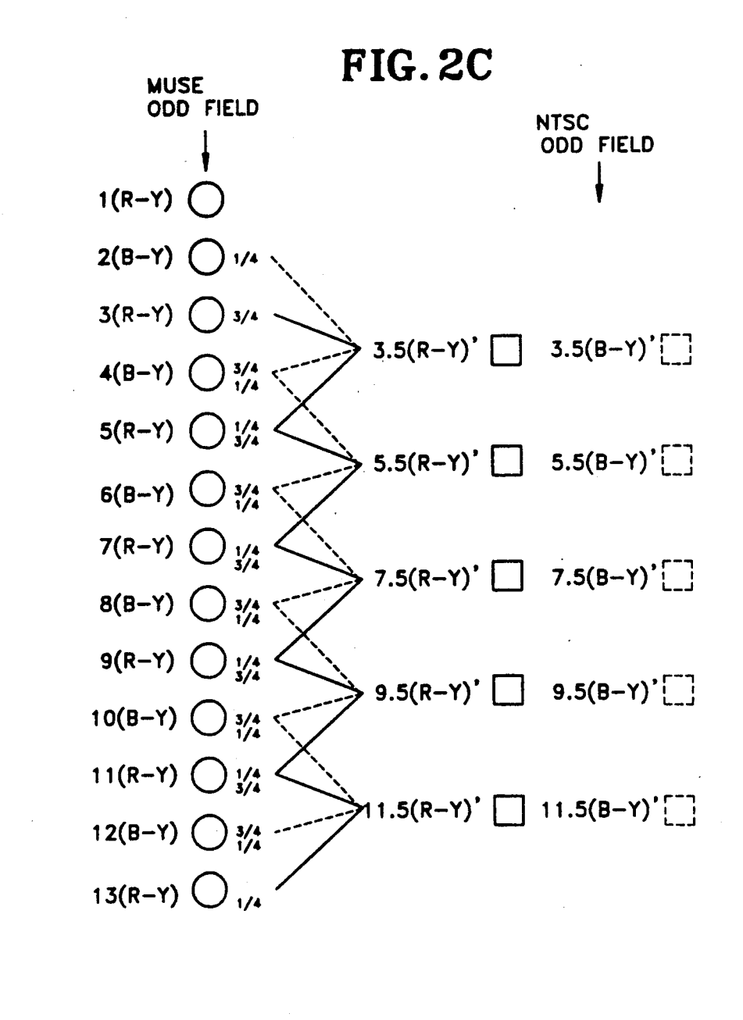
Figure 2D:
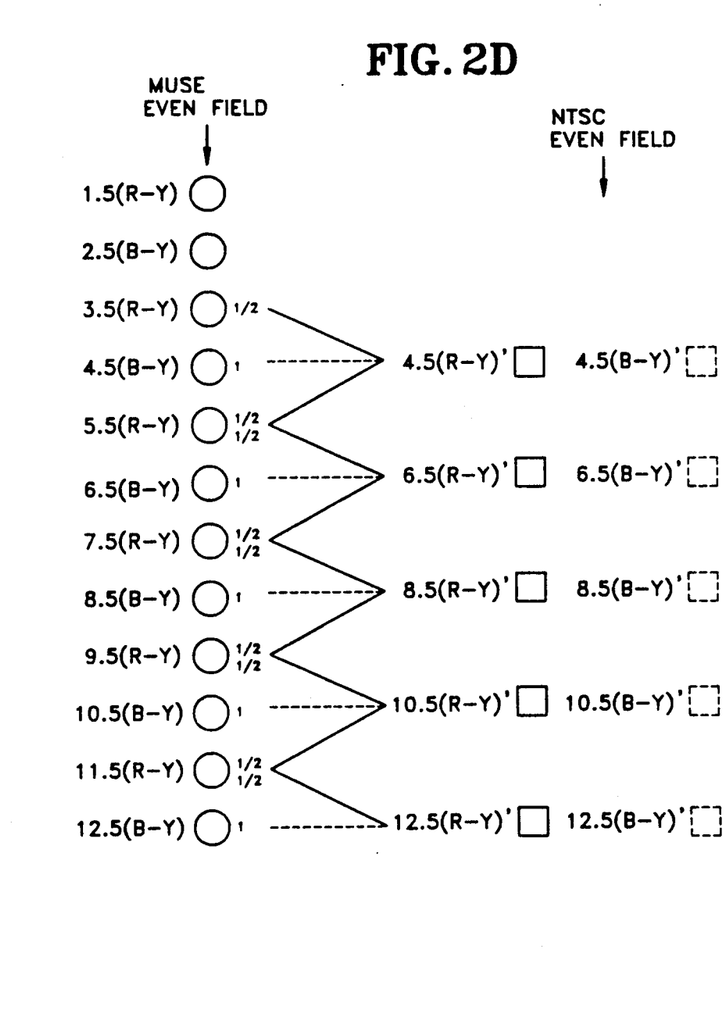

FIGS. 2A-2D show the scanning line number converting principles of a first mode (approximately 525 lines). FIGS. 2A and 2B show the scanning line number converting principles of the odd and even field luminance signals, respectively, while FIGS. 2C and 2D show those of the odd and even field color difference signals (R−Y and B−Y), respectively.

Figure 3A:
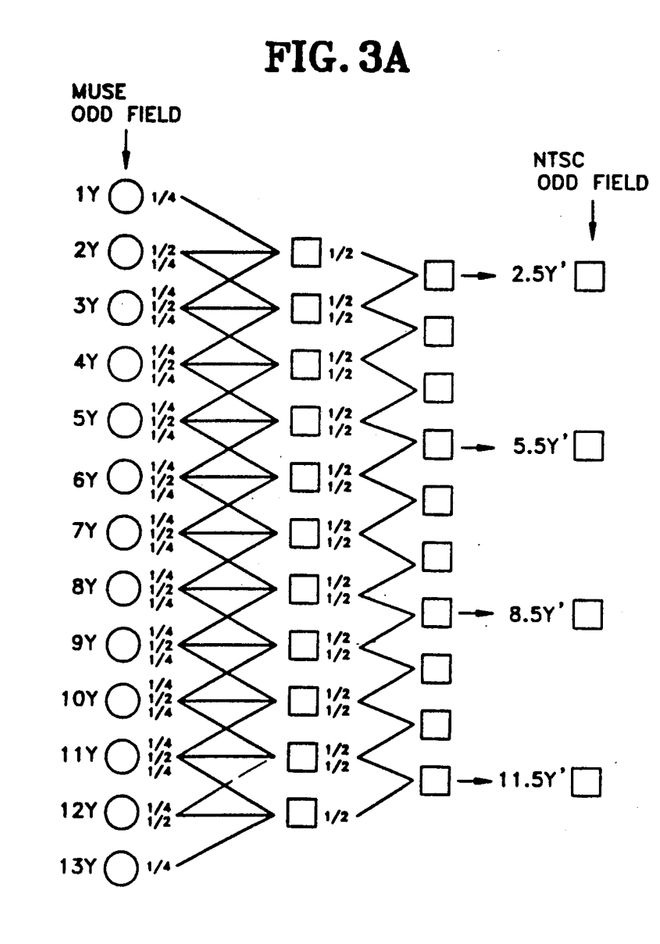
FIGS. 3A to 3D are other principle diagrams showing the conversion of the scanning line number according to the present invention.
Figure 3B:
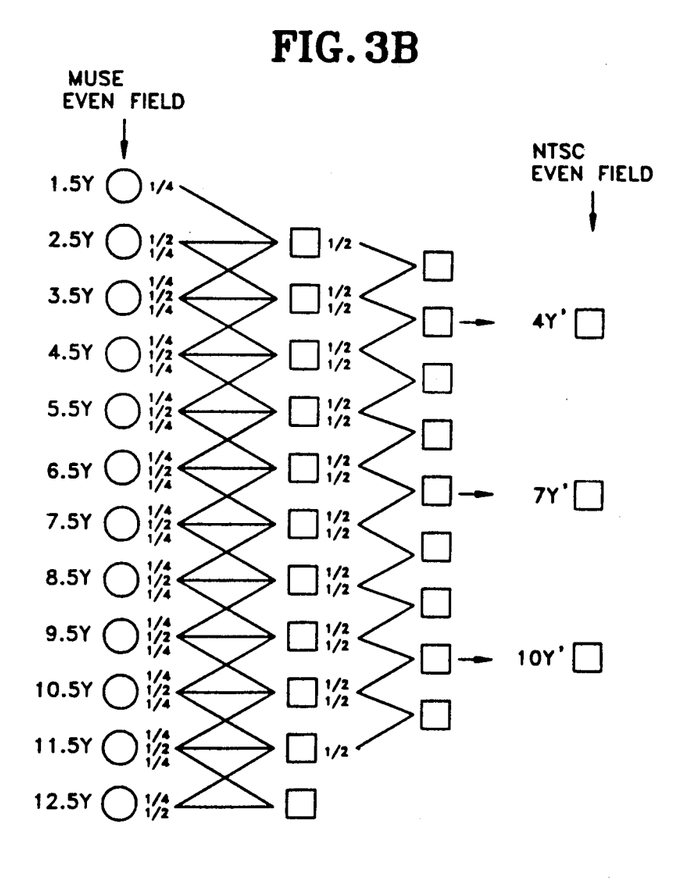
Figure 3C:
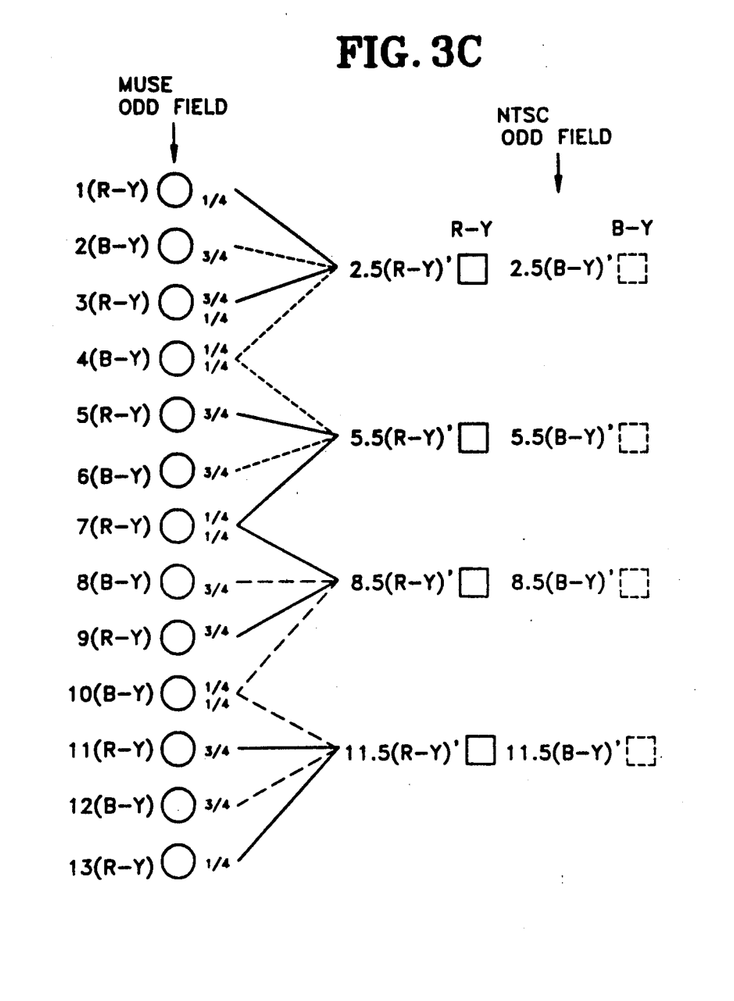
Figure 3D:
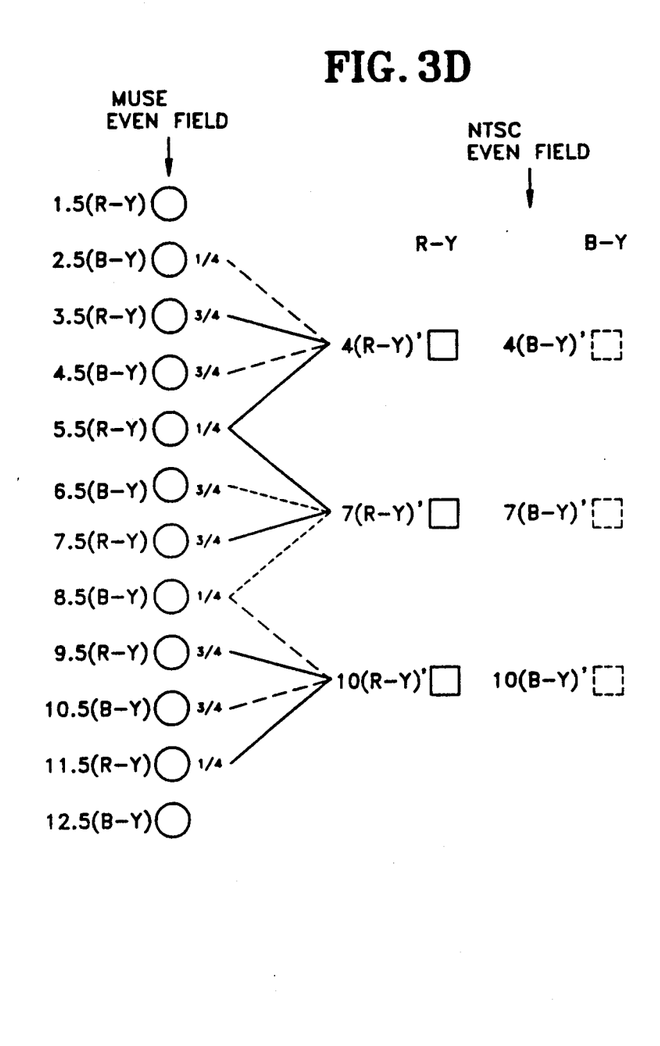

FIGS. 3A-3D show the scanning line number converting principles of a second mode (approximately 375 lines). FIGS. 3A and 3B show the scanning line number converting principles of the odd and even field luminance signals, respectively, while FIGS. 3C and 3D show those of the odd and even field color difference signals, respectively.

Hereinafter, the operation of the apparatus shown in FIG. 1 will be described in detail with reference to FIGS. 2A through 2D and FIGS. 3A through 3D.

The A-D converter 10 converts an analog MUSE signal received through first input terminal 5 into a digital MUSE signal and supplies the converted digital MUSE signal to de-emphasis section 20, control signal generator 70, first PLL portion 80, second PLL portion 81, and audio demodulator 90. De-emphasis section 20 attenuates the high-frequency component emphasized in the digital MUSE signal supplied from A-D converter 10, and supplies it to first line delay 100, first adder 110 and first ROM 130 included in a scanning line number converter 30.

Under the control of control signal generator 70, scanning line number converter 30 converts the scanning line number of the digital MUSE signal supplied from de-emphasis portion 20 into the scanning line number of a first picture screen mode (about 525 scanning lines) or that of a second picture screen mode (about 375 scanning lines). The following is a detailed description of this operation.

The first line delay 100 delays the digital MUSE signal supplied from the de-emphasis portion 20 for one horizontal scanning interval. Second line delay 101 again delays the delayed digital MUSE signal supplied from the first line delay 100 for one horizontal scanning interval. Also, the third line delay 102 further delays the delayed digital MUSE signal supplied from the second line delay 101 for one horizontal scanning interval. The first adder 110 adds the output signal of de-emphasis section 20 to the output signal of first line delay 100 and supplies the added digital MUSE signal to fourth adder 113 through first 3 dB attenuator 120. The second adder 111 adds the output signal of first line delay 100 to the output signal of the second line delay 101 and supplies the added digital MUSE signal to fourth and fifth adders 113 and 114 through second 3 dB attenuator 121. The third adder 112 adds the output signal of the second line delay 101 to the output signal of third line delay 102 and supplies the added digital MUSE signal to fifth adder 114 and first multiplexer 140 through third 3 dB attenuator 122. The fourth adder 113 adds the 3 dB-attenuated output of the first adder 110 supplied from first 3 dB attenuator 120 to the 3 dB-attenuated output of second adder 111 supplied from second 3 dB attenuator 121, and supplies the summed digital MUSE signal to sixth adder 115 through fourth 3 dB attenuator 123. The fifth adder 114 adds the 3 dB-attenuated output of the second adder 111 supplied from second 3 dB attenuator 121 to the 3 dB-attenuated output of third adder 112 supplied from third 3 dB attenuator 122, and supplies the summed digital MUSE signal to sixth adder 115 and first multiplexer 140 through fifth 3 dB attenuator 124. The sixth adder 115 adds the 3 dB-attenuated output of fourth adder 113 supplied from fourth 3 dB attenuator 123 to the 3 dB-attenuated output of fifth adder 114 supplied from fifth 3 dB attenuator 124, and supplies the summed digital MUSE signal to first multiplexer 140 through sixth 3 dB attenuator 125. The first ROM 130 attenuates the digital MUSE signal supplied from the de-emphasis portion 20 to have one quarter of its original amplitude, and supplies it to eighth adder 117. The second ROM 131 attenuates the output signal of first line delay 100 to have three quarters of its original amplitude, and supplies it to ninth adder 118. Also, third ROM 132 attenuates the digital MUSE signal received from second line delay 101 to have three quarters of its original amplitude, and supplies it to eighth adder 117. The fourth ROM 113 attenuates the digital MUSE signal received from the third line delay 102 to have one quarter of its original amplitude, and supplies it to ninth adder 118. The seventh adder 116 adds the digital MUSE signal delayed for one horizontal scanning interval and supplied from the first line delay 100 to the digital MUSE signal delayed for three horizontal scanning intervals and supplied from third line delay 102, then supplies the summed digital MUSE signal to the first input terminal B1 of the second multiplexer 141 through seventh 3 dB attenuator 126. The eighth adder 117 adds the attenuated output of de-emphasis section 20 supplied from first ROM 130 to the attenuated output of second lien delay 101 supplied from third ROM 132, then supplies the summed digital MUSE signal to the second input terminal C2 of third multiplexer 142.

Conclusively, the digital MUSE signal output from third 3 dB attenuator 122 becomes a luminance signal indicated between the odd field MUSE signal and the odd field NTSC signal as shown in FIG. 2A. The digital MUSE signal output from fifth 3 dB attenuator 124 becomes a luminance signal indicated between the even field MUSE signal and the even field NTSC signal as shown in FIG. 2B. The digital MUSE signal output from sixth 3 dB attenuator 125 becomes a luminance signal indicated between the odd field MUSE signal and the odd field NTSC signal as shown in FIG. 3A and becomes a luminance signal between the even field MUSE luminance signal and the even field NTSC luminance signal as shown in FIG. 3B. The digital MUSE signal output from seventh 3 dB attenuator 126 becomes an even field NTSC R−Y signal indicated with a square as shown in FIG. 2D. The digital MUSE signal output from eighth adder 117 becomes an odd field NTSC R−Y signal indicated with solid-lined squares as shown in FIG. 2C or becomes an odd NTSC R−Y or B−Y signal indicated with squares as shown in FIGS. 3C and 3D by the second picture screen mode selection. The digital MUSE signal output from the ninth adder 118 becomes an odd field NTSC B−Y signal indicated with solid-lined squares as shown in FIG. 2C, or becomes an odd field NTSC R−Y signal or B−Y signal shown in FIG. 3C and an even field NTSC R−Y signal or B−Y signal shown in FIG. 3D by the second picture screen mode selection.

The first multiplexer 140 selects the 3 dB-attenuated output of third adder 112 supplied from third 3 dB attenuator 122 to its first input terminal A1 in an odd field of the first screen mode, the 3 dB-attenuated output of fifth adder 114 supplied from fifth 3 dB attenuator 124 to its second input terminal A2 in an even field of the first picture screen mode, and the 3 dB attenuated output of sixth adder 115 received from sixth 3 dB attenuator 125 to its third input terminal A3 in the second picture screen mode, in response to a logic value of the selection signal supplied from first output terminal P1 of control signal generator 70 to its selection terminal S. Then, first multiplexer 140 supplies the selected digital MUSE signal to first input terminal D1 of frequency converter 40. The second multiplexer 141 selectively outputs the color difference signal component input from seventh 3 dB attenuator 126 in the even field of the first picture screen mode and selectively outputs the color difference component input from first adder 118 in the odd field of the first picture screen mode and in both fields of the second picture screen mode, according to the logic value of the selection signal supplied from second output terminal P2 of control signal generator 70 to its selection terminal S. Then, second multiplexer 141 supplies the selected color difference signal to second input terminal D2 of the frequency converter 40. The third multiplexer 142 selects and outputs the color difference signal input from eighth adder 117 in the odd field of the first picture screen mode and in both fields of the second picture screen mode and the color difference signal input from second line delay 101 in the even field of the first picture screen mode, according to the logic value of the 2-bit selection signal supplied from second output terminal P2 of the control signal generator 70 to its selection terminal S. Then, third multiplexer 142 supplies the selected color difference signal to third input terminal D3 of frequency converter 40.

The first PLL portion 80 generates the frequency converting control signal for a first picture screen mode synchronized to the data clock train of the digital MUSE signal supplied from A-D converter 10.

The second PLL portion 81 also generates a frequency converting control signal for a second picture screen mode synchronized to the data clock train of the digital MUSE signal supplied from A-D converter 10.

The PLL selector 82 selects the frequency converting control signal for a first picture screen mode supplied from first PLL portion 80 to its first input terminal V1 in the first picture screen mode, and the frequency converting control signal for a second picture screen mode supplied from the second PLL portion 81 to its second input terminal V2 in the second picture screen mode, according to the logic value of the PLL selection signal supplied from third output terminal P3 of control signal generator 70 to selection terminal S. Then, PLL selector 82 supplies the selected frequency converting control signal to the control terminal of frequency converter 40.

When the frequency converting control signal for a first picture screen mode is input from the PLL selector 82 to the control terminal, frequency converter 40 forms the NTSC luminance signal shown in FIGS. 2A and 2B by sampling the output of the third 3 dB attenuator 122 or the fifth 3 dB attenuator 124 received from first multiplexer 140 to its first input terminal D1 in a luminance signal interval of one scanning line every two scanning lines. At the same time, frequency converter 40 forms the R−Y and B−Y signals shown in FIGS. 2C and 2D by sampling the output of ninth adder 118 or first 3 dB attenuator 126 received from second multiplexer 141 to second input terminal D2 in a color difference signal interval of one scanning line every two scanning lines. Also, frequency converter 40 forms the R−Y and a B−Y signals shown in FIGS. 2C and 2D by sampling the output of eighth adder 117 or second line delay 101 supplied from third multiplexer 142 to the third input terminal D3 in the color difference signal interval of one scanning line every two scanning lines.

Further, when the frequency converting control signal for a second picture screen mode is input from PLL selector 82 to the control terminal, frequency converter 40 forms the NTSC luminance signal shown in FIGS. 3A and 3B by sampling the output of sixth 3 dB attenuator 125 received from first multiplexer 140 to the first input terminal D1 in a luminance signal interval of one scanning line every three scanning lines. Also, frequency converter 40 forms the NTSC R−Y and B−Y signals shown in FIGS. 3C and 3D by sampling the outputs of the ninth adder 118 and the eighth adder 117 alternatively received from second multiplexer 141 to second input terminal D2 in the color difference signal interval of one scanning line every three scanning lines. Additionally, frequency converter 40 forms the NTSC R−Y and B−Y signals shown in FIGS. 3C and 3D by sampling the outputs of eighth adder 117 and ninth adder 118 alternatively received from third multiplexer 142 to the third input terminal D3 in the color difference signal interval of one scanning line every three scanning lines.

In addition, frequency converter 40 selects the formed NTSC luminance, R−Y and B−Y signals so that constant luminance, R−Y, and B−Y signals are output from the respective output terminals. At the same time, frequency converter 40 lengthens the selected signals along the time base and supplies them to D-A converter 50.

The D-A converter 50 converts the digital luminance, R−Y, and B−Y signals supplied from frequency converter 40 into analog luminance R−Y and B−Y signals, and supplies the analog luminance, R−Y and B−Y signals to inverse matrix circuit 60.

The inverse matrix circuit 60 combines the analog luminance, R−Y and B−Y signals supplied from D-A converter 50 to generate R, G, and B signals, then respectively transmits the R, G, and B signals through first, second and third output terminals 25, 35 and 45.

The control signal generator 70 separates a control signal from the digital MUSE signal supplied from A-D converter 10 and generates a PLL selecting signal for controlling the selecting state of PLL selector 82 and selection signals for controlling the selecting state of first, second and third multiplexers 140, 141 and 142, according to the separated control signal and the logic state of the converting mode command supplied from second input terminal 15.

Additionally, in FIG. 1, first, second and third line delays 100, 101 and 102, first through ninth adders 110-118, first through fourth ROMs 130-133, and seven 3 dB attenuators 120-126 constitute one vertical filter. The vertical filter together with first multiplexer 140 and the second and third multiplexer pair (141 and 142) constitute a luminance/chrominance selection circuit 30.

The audio demodulator 90 detects the audio signal included in the digital MUSE signal supplied from the A-D converter 10 and transmits the detected audio signal through fourth output terminal 55.

As described above, according to the present invention, there are advantages in that the circuit constitution can be simplified by selectively performing the scanning line conversion from a MUSE signal to a television signal of an interlaced scanning method having a different number of scanning lines using a vertical filter which uses vertical correlation. Also, deterioration of the picture during conversion can be prevented using the vertical correlation during the scanning line conversion.

What is claimed is:

1. A television signal conversion method for converting a MUSE television signal having 1,125 scanning lines into another television signal having a different scanning line number according to a picture screen mode, said method comprising the steps of:
    vertically filtering said MUSE television signal for generating at least two sets of luminance and color difference signals having a different vertical correlation from said MUSE television signal;
    selecting one luminance signal and two color difference signals among said at least two luminance and color difference signals generated in said vertical filtering step according to said picture screen mode; and
    frequency-converting to sample said one luminance signal and two color difference signals selected in said selecting step into a luminance signal and two color difference signals having the scanning line number corresponding to said picture screen mode, and to horizontally lengthen said sampled luminance and color difference signals.

2. A television signal conversion method as claimed in claim 1, wherein the luminance signals generated in said vertical filtering step comprise signals formed by mixing two, three, and four scanning line luminance signal components, and the color difference signals comprise signals formed by mixing one and two scanning line color difference signal components.

3. A television signal conversion method as claimed in claim 2, wherein the mixing ratio of the signal formed by mixing said two scanning line luminance signals is 1:1, the mixing ratio of the signal formed by mixing said three scanning line luminance signals is 1:2:1 and the mixing ratio of the signal formed by mixing said four scanning line luminance signals is 1:3:3:1.

4. A television signal conversion method as claimed in claim 3, wherein the signals formed by mixing two scanning line color difference signals include the signals mixed with the ratios 3:1, 1:3 and 1:1.

5. A television signal converting apparatus for converting a MUSE television signal having 1,125 scanning lines into another television signal having a difference scanning line number according to a picture screen mode, comprising:
    a first input terminal for receiving an analog MUSE signal;
    an A-D converter for converting said analog MUSE signal of said first input terminal into a digital MUSE signal;
    vertical filtering means for vertically filtering the digital MUSE signal supplied from said A-D converter and generating at least two luminance signals and at least three color difference signals having a different vertical correlation;
    first signal selecting means for selecting one of at least two luminance signals supplied from said vertical filtering means;
    second signal selecting means for selecting two of at least three color difference signals supplied from said vertical filtering means;
    frequency converting means for sampling a luminance signal and two color difference signals having a scanning line number according to the picture screen mode among the luminance signal and two color difference signals supplied from said first and second signal selecting means and horizontally lengthening the sampled signals;

a D-A converter for converting the luminance signal and two color difference signals supplied from said frequency converting means into analog signals;

first and second PLLs for receiving the digital MUSE signal from said A-D converter and generating the pulse signals which have different periods needed in said frequency converting means according to the picture screen mode;

PLL selecting means for selecting the pulse signals from said first and second PLLs according to the picture screen mode and supplying them to said frequency converting means;

a second input terminal for receiving a picture screen mode assigning signal; and control means for controlling said first and second signal selecting means and said PLL selecting means by the picture screen mode assigning signal supplied from said second input terminal and the control signal included in the digital MUSE signal supplied from said A-D converter.

6. A television signal converting apparatus as claimed in claim 5, wherein said vertical filtering means comprises:

first, second and third line delays connected in series for delaying the digital MUSE signal supplied from said A-D converter for one scanning line interval;

first mixing means for mixing the outputs of said second and third line delays and supplying it to said first selecting means;

second mixing means for mixing the outputs of said first, second and third line delays and supplying it to said first selecting means;

third mixing means for mixing the outputs of said first, second and third line delays and the digital MUSE signal supplied from said A-D converter and supplying it to said first signal selecting means;

fourth and fifth mixing means for mixing the outputs of said first and third line delays with different mixing ratios and supplying them to said second signal selecting means; and sixth mixing means for mixing the output of said second line delay and the output of said A-D converter and supplying it to said second signal selecting means.

7. A television signal converting apparatus as claimed in claim 6, wherein said first mixing means mixes the outputs of said first and second line delays with the ratio of 1:1, said second mixing means mixes the outputs of said first, second and third line delays with the ratio of 1:2:1 and said third mixing means mixes the output of said A-D converter and the outputs of said first, second and third line delays with the ratio of 1:3:3:1.

8. A television signal converting apparatus as claimed in claim 7, further comprising an inverse matrix circuit for combining the analog luminance and color difference signals supplied from said D-A converter to generate a specified type television signal.

* * * * *

UNITED STATES PATENT AND TRADEMARK OFFICE
CERTIFICATE OF CORRECTION

PATENT NO. : 5,194,937

DATED : March 16, 1993

INVENTOR(S) : Chang-jun LEE, et al.

It is certified that error appears in the above-identified patent and that said Letters Patent is hereby corrected as shown below:

Column 5, line 26, "lien" should be --line--

Signed and Sealed this

Twelfth Day of April, 1994

Attest:

BRUCE LEHMAN

Attesting Officer

Commissioner of Patents and Trademarks